Inventor
Leon Wallerstein Jr.
By Ralph Hammar
Attorney

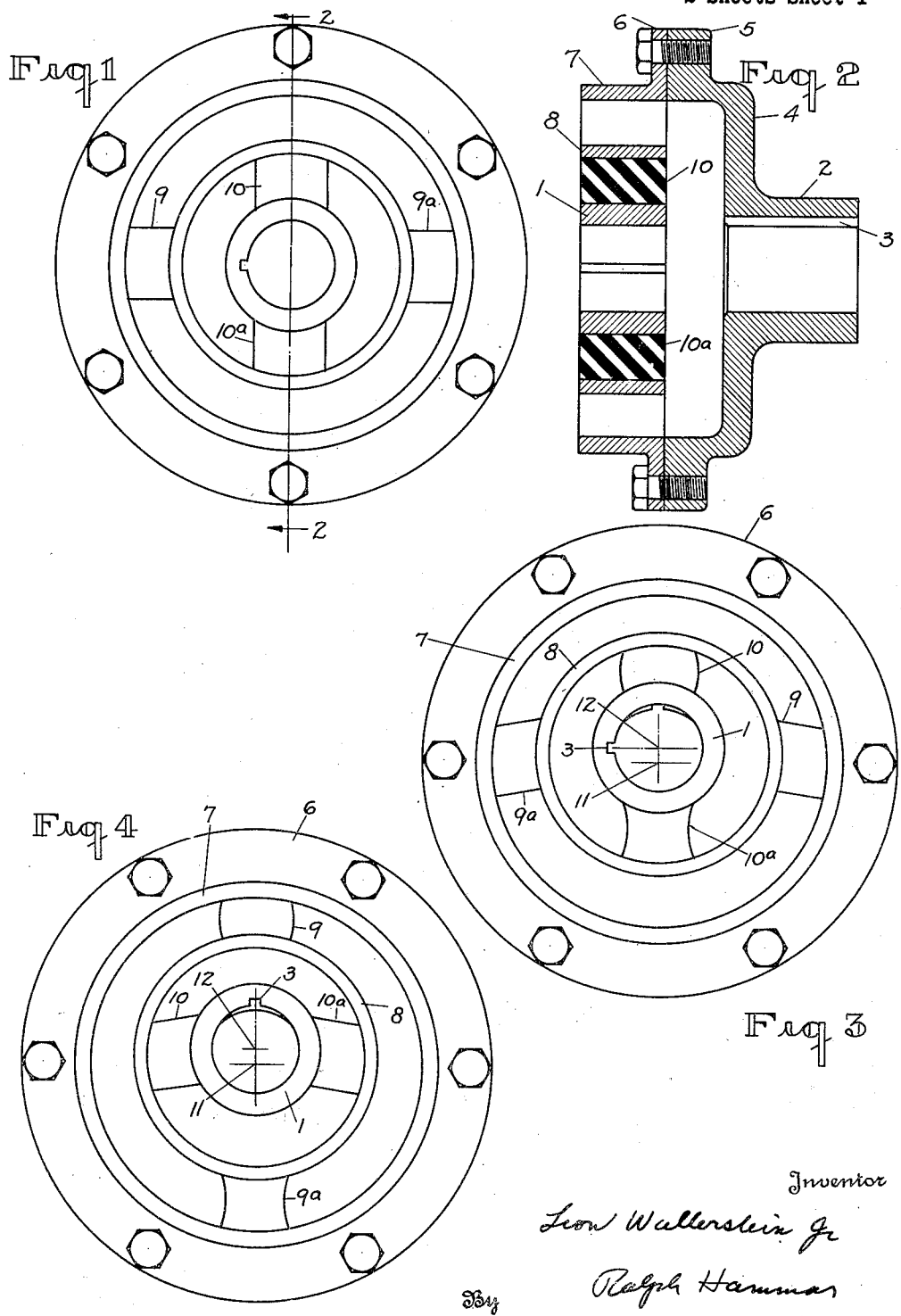

Patented Apr. 24, 1951

2,550,101

UNITED STATES PATENT OFFICE 2,550,101

FLEXIBLE COUPLING

Leon Wallerstein, Jr., Erie, Pa., assignor to Lord Manufacturing Company, Erie, Pa., a corporation of Pennsylvania Application November 28, 1944, Serial No. 565,528

3 Claims. (Cl. 64—11)

The present invention relates to flexible couplings for accommodating angular and parallel misalignment in which a floating intermediate part is alternately connected to driving and driven members by rubber parts having radially spaced attaching surfaces. In this coupling the torque is transmitted in shear and misalignment is accommodated primarily in shear. Further objects and advantages appear in the specification and claims.

Figure 6:
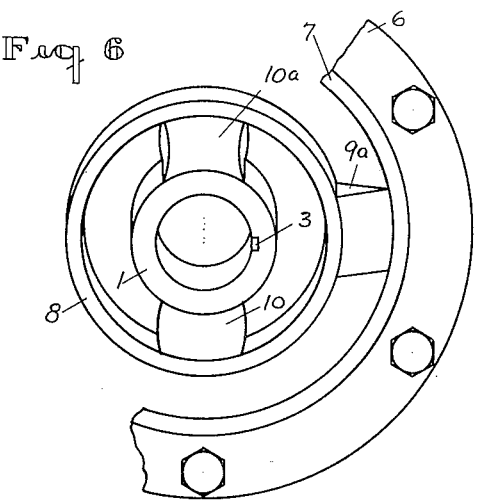
Figure 5:
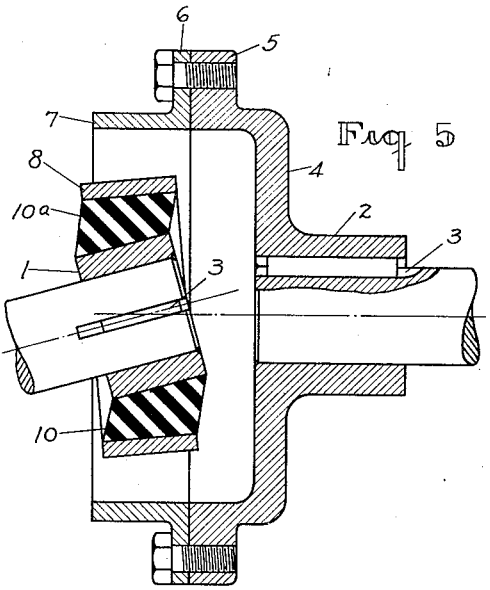
Figure 8:
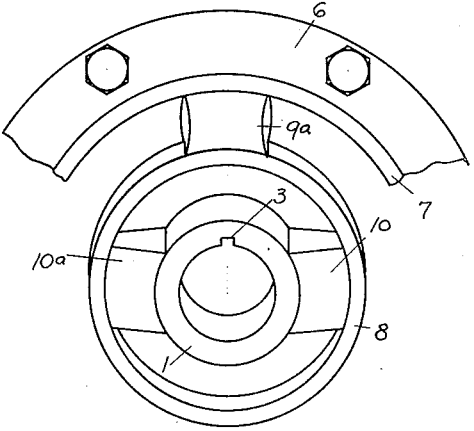
Figure 7:
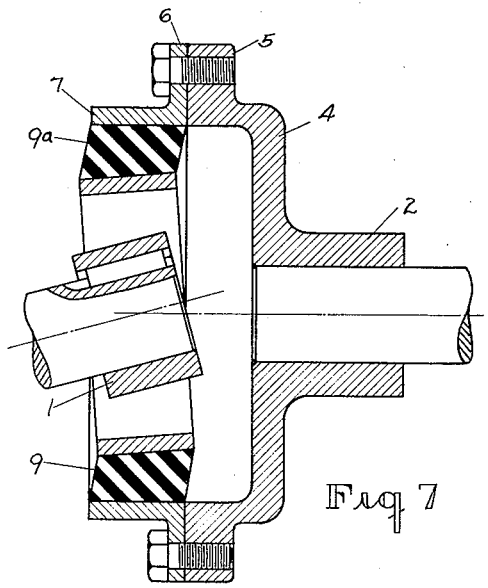

In the accompanying drawing, Fig. 1 is an end elevation of a coupling embodying my invention; Fig. 2 is a sectional view on line 2—2 of Fig. 1; Figs. 3 and 4 are end elevations illustrating the operation of the coupling under parallel misalignment; Figs. 5 and 7 are sectional elevations illustrating the operation under angular misalignment; and Figs. 6 and 8 are fragmentary views of the coupling in the position corresponding to Figs. 5 and 7.

Referring to the drawing, 1 and 2 indicate the driving and driven members which are illustrated as axially spaced hubs with keyways 3. One of the hubs 2 is integral with a cup 4 having a flange 5 to which is bolted a flange 6 on a ring 7 surrounding the hub 1. Between the outer surface of the hub 1 and the inner surface of the ring 7 is a ring 8 having diametral points of its outer surface connected to the ring 7 by rubber shear members 9 and 9a and having intermediate diametral points of its inner surface connected to the hub 1 by rubber shear members 10 and 10a. The rubber members are preferably connected by bonding to the respective surfaces.

When there is no misalignment, the inner and outer surfaces of the ring 8 are concentric with and uniformly spaced from the inner and outer surfaces of the ring 7 and the hub 1. In case of parallel misalignment, as indicated in Figs. 3 and 4, where the axis of the hub 2 is indicated at 11 and the axis of the hub 1 is indicated at 12, the misalignment is primarily accommodated by shear deflection of the rubber members.

In the position shown in Fig. 3, the rubber members 9 and 9a are deflected in shear and the rubber members 10 and 10a are respectively deflected in compression and tension. Since the rubber is softer in shear than in compression or tension, the greater part of the misalignment is accommodated by the rubber members 9 and 9a.

In the position shown in Fig. 4, in which the hubs are rotated through a quarter revolution, the misalignment is accommodated by shear in the rubber members 10 and 10a and the rubber members 9 and 9a are subjected respectively to compression and tension. Although there is a continual shifting of the stress in the rubber members, there is in all positions a substantial shear stress for accommodating parallel misalignment.

Figs. 5 to 8 illustrate the operation of the coupling under angular misalignment. In the position shown in Figs. 5 and 6 the angular misalignment is partially accommodated by tilting of the hub 1 with reference to the ring 8 which results in a shear stress in the rubber members 10 and 10a, and is partially accommodated by a twisting shear of the rubber members 9 and 9a connecting the ring 8 to the ring 7. In this position the ring 8 is tilted to a position intermediate the hub 1 and the ring 7.

In the position represented by Figs. 7 and 8 in which the coupling has turned through a quarter revolution, the angular misalignment is accommodated by a tilting of the ring 8 with respect to the ring 7, which results in a shear stress in the rubber members 9 and 9a and by a twisting shear in the rubber members 10 and 10a connecting the ring 8 to the hub 1.

In all positions of the coupling the driving torque is transmitted from the driving to the driven members through the intermediate ring 8 by circumferential shear of the rubber connecting members. This provides a torsionally resilient connection which is effective in cushioning torsional vibrations.

What I claim as new is:

1. In a coupling, inner and outer driving and driven members having circumferentially extending radially spaced surfaces, an intermediate member between and radially spaced from each of said surfaces, and angularly spaced rubber blocks alternately disposed on and secured to the inner and outer surfaces of the intermediate member and respectively secured to the surfaces of the inner and outer members.

2. In a coupling, inner and outer driving and driven members having opposed radially spaced surfaces, a ring between and spaced from each of said surfaces, radially extending angularly spaced rubber blocks alternately disposed on the inner and outer surfaces of the ring and connecting the ring to one and the other of said surfaces, said blocks being bonded at one end to the ring and at the other end to one of said surfaces.

3. In a coupling, driving and driven members having opposed radially spaced surfaces, a ring between and radially spaced from each of said surfaces, diametrically disposed rubber blocks bonded at the ends to the ring and to one of the surfaces, and other rubber blocks diametrically disposed substantially at right angles to the first blocks and bonded at the ends to the ring and to the other of the surfaces.

LEON WALLERSTEIN, Jr.

REFERENCES CITED

The following references are of record in the file of this patent:

UNITED STATES PATENTS

| Number | Name | Date |
|---|---|---|
| 1,633,580 | Froesch | June 28, 1927 |
| 1,924,269 | Brown | Aug. 29, 1933 |
| 2,187,706 | Julien | Jan. 16, 1940 |